United States Patent
Reece

(10) Patent No.: US 8,382,033 B2
(45) Date of Patent: Feb. 26, 2013

(54) BALLISTIC RESISTANT AND EXPLOSIVE CONTAINMENT SYSTEMS FOR AIRCRAFT

(76) Inventor: Gary Thomas Reece, Rolling Hills Estates, CA (US)

(*) Notice: Subject to any disclaimer, the term of this patent is extended or adjusted under 35 U.S.C. 154(b) by 936 days.

(21) Appl. No.: 12/154,167

(22) Filed: May 21, 2008

(65) Prior Publication Data
US 2011/0001009 A1 Jan. 6, 2011

Related U.S. Application Data

(60) Provisional application No. 60/931,043, filed on May 21, 2007.

(51) Int. Cl.
*B64C 9/00* (2006.01)
(52) U.S. Cl. .................. 244/118.1; 220/1.5; 220/560.01
(58) Field of Classification Search ............... 244/118.1; 89/36.11; 312/409; 220/560.01; *B64D 9/00*
See application file for complete search history.

(56) References Cited

U.S. PATENT DOCUMENTS

| | | | |
|---|---|---|---|
| 3,797,691 A * | 3/1974 | Williams, Jr. ................ | 220/1.5 |
| 4,140,148 A * | 2/1979 | Richter ....................... | 137/240 |
| 4,325,488 A * | 4/1982 | Ketner ......................... | 220/1.5 |
| 5,267,665 A * | 12/1993 | Sanai et al. .................. | 220/88.1 |
| 5,595,431 A * | 1/1997 | Mlakar ........................ | 312/409 |
| 5,599,082 A * | 2/1997 | Mlakar et al. ............... | 312/409 |
| 5,645,184 A * | 7/1997 | Rowse et al. ................ | 220/1.5 |
| 5,769,257 A * | 6/1998 | Fleisher et al. .............. | 220/1.5 |
| 6,161,714 A * | 12/2000 | Matsuura et al. ............ | 220/1.5 |
| 6,435,363 B2 * | 8/2002 | Fingerhut et al. ........... | 220/1.5 |
| 6,568,310 B2 * | 5/2003 | Morgan ....................... | 89/36.02 |
| 6,703,104 B1 * | 3/2004 | Neal ............................ | 428/118 |
| 6,860,115 B2 * | 3/2005 | Norelius et al. ............. | 62/387 |
| 6,991,124 B1 * | 1/2006 | Palley et al. ................ | 220/1.5 |
| 7,498,938 B2 * | 3/2009 | Ulrich ......................... | 340/539.13 |
| 7,685,921 B2 * | 3/2010 | Dagher et al. ............... | 89/36.02 |
| 7,721,752 B2 * | 5/2010 | Stotkiewitz et al. ......... | 137/246 |
| 7,806,195 B2 * | 10/2010 | Popp et al. .................. | 169/16 |
| 2004/0107823 A1 * | 6/2004 | Kiley et al. ................. | 86/50 |
| 2005/0188825 A1 * | 9/2005 | Sharpe et al. ............... | 86/50 |
| 2006/0145009 A1 * | 7/2006 | Shockey et al. ............. | 244/121 |

OTHER PUBLICATIONS

Ashley, Steven. "Safety in the sky: designing bomb-resistant baggage containers." Mechanical Engineering-CIME. American Society of Mechanical Engineers. Jun. 1, 1992.*
"Fire Safety Aspects of Polymeric Materials vol. 6: Aircraft: Civil and Military." National Materials Advisory Board Publication NMAB 318-6. 1977.*
FAA Notice of proposed rulemaking (NPRM) Notice No. 06-19, Jan. 5, 2007.

* cited by examiner

*Primary Examiner* — Tien Dinh
*Assistant Examiner* — Michael Kreiner
(74) *Attorney, Agent, or Firm* — Christopher Paul Mitchell

(57) ABSTRACT

A ballistic resistant and explosive protective system for an aircraft. The system may include a plurality of composite panels. Each composite panel may include a first layer and second layer formed of a fiber-reinforced plastic material, and a ballistic resistant laminate core layer formed between the first layer and the second layer. The composite panels may be integrally combined and installed at an interior of the aircraft.

16 Claims, 17 Drawing Sheets

BALLISTIC RESISTANT AND EXPLOSIVE CONTAINMENT SYSTEMS FOR AIRCRAFT

CROSS-REFERENCE TO RELATED APPLICATION

This application claims priority from U.S. Provisional Application Ser. No. 60/931,043, entitled "Transport aircraft explosive and ballistic resistant and containment system", filed May 21, 2007, which is herein incorporated by reference in its entirety.

BACKGROUND

1. Field

Exemplary embodiments of the present invention relate generally to aircraft. More particularly, exemplary embodiments of the present invention relate to ballistic resistant and explosive containment systems for aircraft.

2. Description of the Related Art

Transport aircraft have been a vulnerable target for terrorist activities for many years. Not until 911, did the air transport industry do anything to help protect the aircraft from becoming a guided missile which could be used to attack high value targets. After these terrible events, the FAA regulated that the cockpit doors for all transport aircraft become reinforced to provide ballistic and intrusion resistance of the cockpit thereby deterring terrorists from gaining control of the aircraft. As you fly today, every passenger and cargo aircraft have these hardened cockpit doors. In addition to the reinforced cockpit doors, the air transport industry implemented the TSA (or equivalent worldwide) to check 100% of passenger carry-on baggage. As of this application, these are the only two actions that have been implemented on commercial aircraft to protect the public from air terrorism.

Post 911, some believed that this threat to transport aircraft would not only continue to increase but would become even a larger stage for terrorism. This appears to have proven true. An example is the August 2006 plot in which terrorists planned to attack 10 aircraft simultaneously.

In light of the foregoing, it is desirable to provide additional safety measures for aircraft.

BRIEF SUMMARY

According to an aspect of the present invention, a ballistic resistant and explosive protective system for an aircraft may be provided. The system may include a plurality of composite panels. Each composite panel may include a first layer and second layer formed of a fiber-reinforced plastic material, and a ballistic resistant laminate core layer formed between the first layer and the second layer. The composite panels may be integrally combined and installed at an interior of the aircraft.

According to another aspect of the invention, a cargo container of a ballistic resistant and explosive protective system for an aircraft may be provided. The cargo container may include a pallet portion comprising a plurality of rails extruded from perimeter edges thereof, and a plurality of composite panels. Each composite panel may include a first layer and second layer formed of a fiber-reinforced plastic material, and a ballistic resistant laminate core layer formed between the first layer and the second layer. The composite panels may be attached to a bottom portion via the plurality of rails. The cargo container may further include a plurality of locking devices for interlocking the composite panels to each other. The cargo container may include a plurality of relief devices on at least one panel of the interlocking composite panels.

The foregoing and other aspects will become apparent from the following detailed description when considered in conjunction with the accompanying drawing figures.

DETAILED DESCRIPTION

Figure 1:
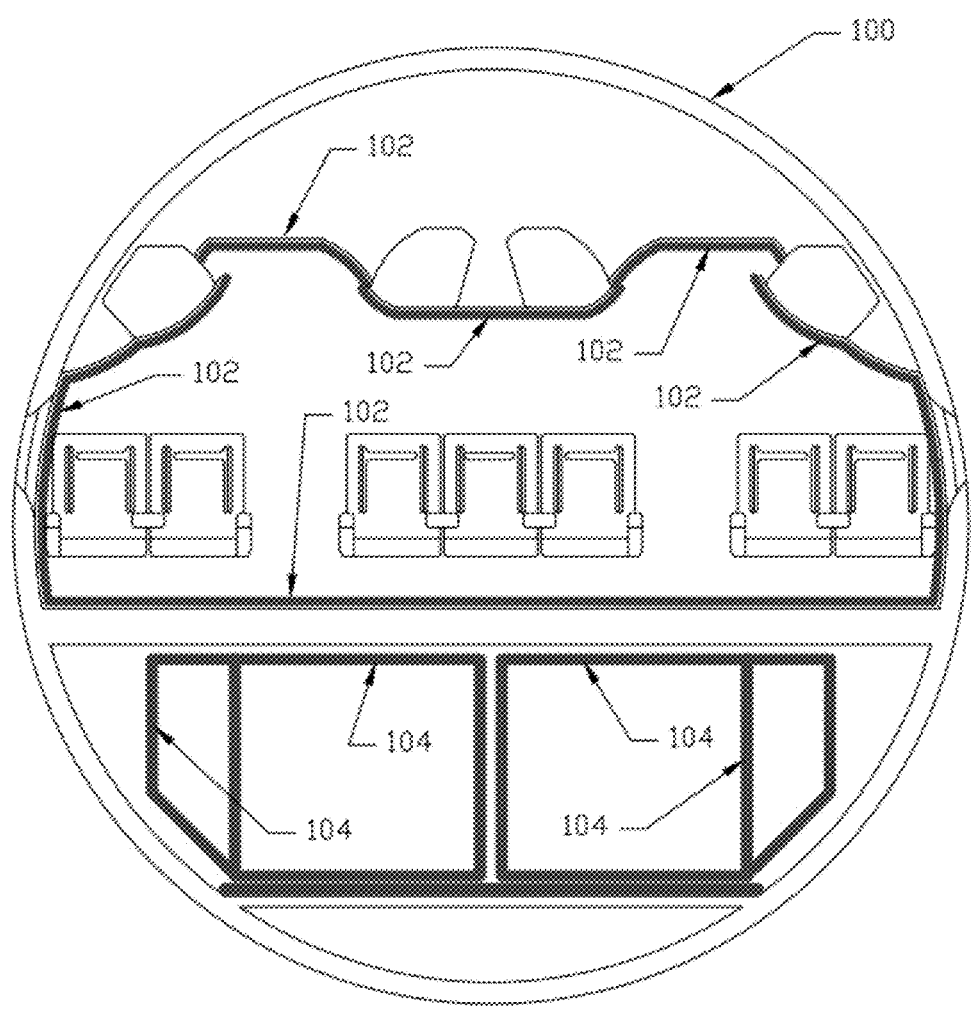
FIGS. 1 and 2 are schematic representations of a section of an aircraft fuselage including a ballistic resistant and explosive protective system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures.

As used in the description of this application, the terms "a", "an" and "the" may refer to one or more than one of an element (e.g., item or act). Similarly, a particular quantity of an element may be described or shown while the actual quantity of the element may differ. Likewise, a particular measurement may be described or shown while the actual measurement may differ. The terms "and" and "or" may be used in the conjunctive or disjunctive sense and will generally be understood to be equivalent to "and/or". References to "an" or "one" embodiment are not necessarily all referring to the same embodiment. Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present.

The events of 911 have changed our world forever. The risk and reality of terrorist attacks are part of our daily lives. The world must develop methods and tools to mitigate the effect of these attacks and we must be able and willing to utilize these tools on a daily basis. Commercial aircraft have become a focal point of terrorists because of the opportunity they present as a threatened vehicle. Aircraft are vulnerable because of the passengers and cargo.

After 911, all commercial aircraft in the world were required to install hardened ballistic and intrusion resistant cockpit doors by the airworthiness authorities. By November of 2002 all of the aircraft in the world were retrofitted. Now, 7 years after 911, little has been done to protect the aircraft from explosive devices in the checked baggage or on cargo aircraft.

Checked baggage and air cargo represents a huge threat in that only a small percentage of baggage is checked for explosives during the aircraft loading cycles. This is at least in part because of lobbying to defeat laws that would require greater scrutiny of checked baggage because of the additional expense to the airlines. As of this application, passengers are screened nearly 100% but cargo/baggage is screened less than 40%.

Because of this situation, a newly developed device which would protect aircraft would represent an opportunity to build a new market with a new product which would save lives and help protect America. A design for an explosion and ballistic resistant commercial aircraft cargo container is accordingly presented herein. Historically, a limitation in presenting the market with a new product of this type was that this device was not required by the regulatory or airworthiness agencies. The airline industry does not spend money unless they have to and the airline industry has powerful lobbyists to prevent expensive legislation from being imposed on the airline industry.

On Dec. 22, 2006, the FAA released a rulemaking proposal to require all aircraft to not only harden the cargo compartments but to harden the interiors of the aircraft in order to protect the aircraft flight control systems in the event of an explosion on board. The proposed Rule Change would be implemented within 14 Months.

This proposal indicates that the FAA and Homeland Security would expect additional terrorist threats and events in the future. The Presidents Report on Combating Terrorism also strongly indicates that future terrorist threats, from multiple sources, are real.

In light above, a design for hardened-interiors is accordingly presented herein in addition to the cargo container design.

Turning to the cargo containers, in the event that these explosive devises become an airworthiness requirement, the 600,000 existing containers would all require replacement with the new hardened containers. The current cargo container industry does not have the capacity to accommodate a relatively short FAA implementation schedule (regardless of the design concepts).

Congress has attempted legislation which would require the 100% electronic inspection of all cargo and checked baggage on transport aircraft. As of this filing, the technology to accommodate this requirement is not believed to exist, and an industry estimate is that a device may be available in three years. However, the cost of acquisition, deployment, training and installation of these devices in the airports around the world may take considerably longer.

Even if the devices were developed to successfully 100% inspect cargo and baggage, the airline and cargo industry would not have the capacity to inspect these items in a reasonable turnaround time for commercial aircraft to continue to meet departure demands. This means that the transport aircraft industry would need to reduce the number of daily departures worldwide. If this scenario were to develop, the economic impact to one of the largest industries in the world may be devastating. Therefore, the White House has positioned to not approve the legislation to 100% electronically inspect cargo and checked baggage.

In view of the above, other tool or devices should be utilized to protect the traveling public from on board terrorist actions.

The hardened cargo container discussed herein is a proven technology that can be produced in a short period of time and will mitigate the explosive and ballistic effect of an explosive event on board an aircraft.

Turning to the hardened interiors, this aspect represents a large market segment and may include different options for implementation; license or manufacture. Both options provide for attractive return on investment scenarios.

The concept and design may incorporate the replacement of existing interior shell parts and assemblies with the "hardened" new design and constructed parts represented herein. These new parts will meet or exceed the ballistic resistant requirements of the FAA NPRM Docket Number 2006-26722, Notice No. 06-19 and subsequent FAA NPRM filings.

Explosive and Ballistic Protective Boundary Concept

FIG. 1 is a schematic representation of a section of an aircraft fuselage including a ballistic resistant and explosive protective system 100 according to an exemplary embodiment. The explosive and protective boundary concept is to provide a hardened aircraft interior integrated system with explosive/ballistic resistant cargo containers. In general, a ballistic protective shell is provided that uses aircraft interior linings in conjunction with ballistic and explosive cargo containers to prohibit the flight control system of the aircraft from becoming inoperative in the case of an on-board event. The explosive and protective boundary concept is embodied in the ballistic resistant and explosive protective system 100 depicted in FIG. 1. The ballistic resistant and explosive protective system 100 may include composite panels 102 and cargo containers 104. The composite panels 102 may form the interior linings of the aircraft passenger compartment and may form as the ballistic protective shell which prohibits the flight control system from becoming inoperative in the case of an on-board explosive event. This may satisfy a requirement of FAA-NPRM 2006-2572.

Figure 2:
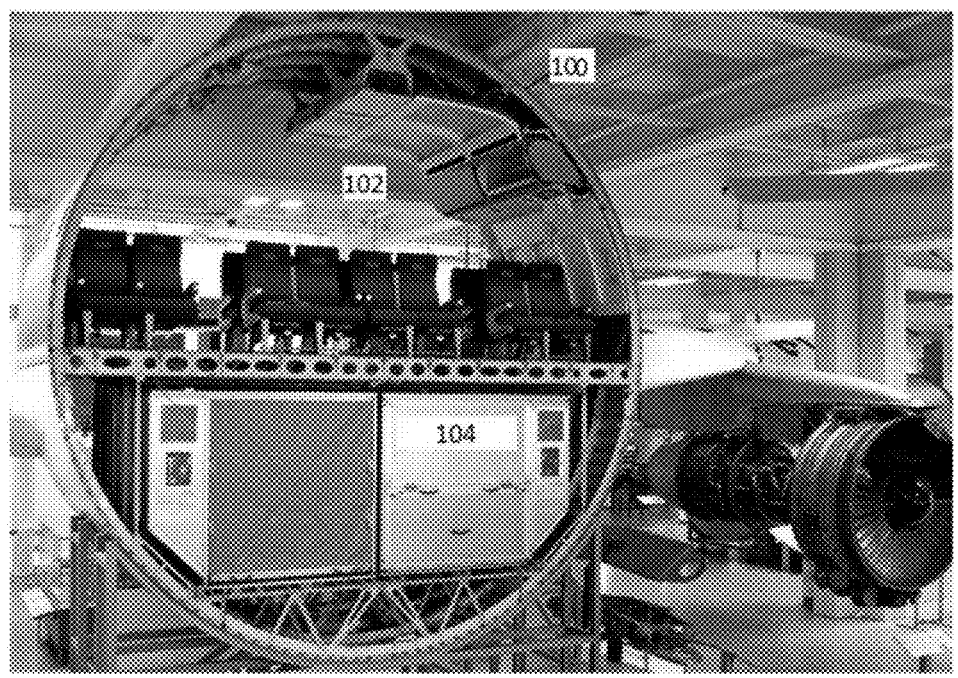

The ballistic resistant and explosive protective system 100 is further depicted in FIG. 2. The panels 102 and cargo containers 104 may work together to provide ballistic protection and explosive resistance of the interior of a fuselage of, for example, a commercial transport category aircraft. The ballistic resistant and explosive protective system 100 may prohibit the flight control system from becoming inoperative in the case of an on-board explosive event. The ballistic resistant and explosive protective system may meet or exceed the requirement of FAA NPRM 2006-2572.

Design Description

Design Concept

The general design concept provides protection of the cockpit, flight control systems, catastrophic primary structural failure of the aircraft and containment of fire and projectiles caused as the result of an on-board explosive event. The ballistic resistant and explosive system 100 also may provide flammability resistant non-metallic materials and extinguishing systems within the aircraft cargo compartments 104. This explosive and ballistic resistant and containment system may provide economical products with the minimum weight impact to the aircraft.

Cargo Containers

Conventional Designs

The conventional materials of construction for existing Unit Load Devices (ULD) are aluminum sheets riveted to welded aluminum structures which are attached to pallets. Several problems exist with this type of construction:

Aluminum processing and material costs are increasing primarily because Bauxite mining and processing is becoming more expensive due to labor and energy costs.

The primary container/pallet companies are linked to aluminum raw material processors and/or mining operations. This creates a competitive raw material costing issue.

Repair and overhaul of the ULD is expensive, time consuming and requires access to replacement raw materials.

These materials of construction and designs do not incorporate any explosion, ballistic or fire resistance capability or properties.

New Design

Figure 3:
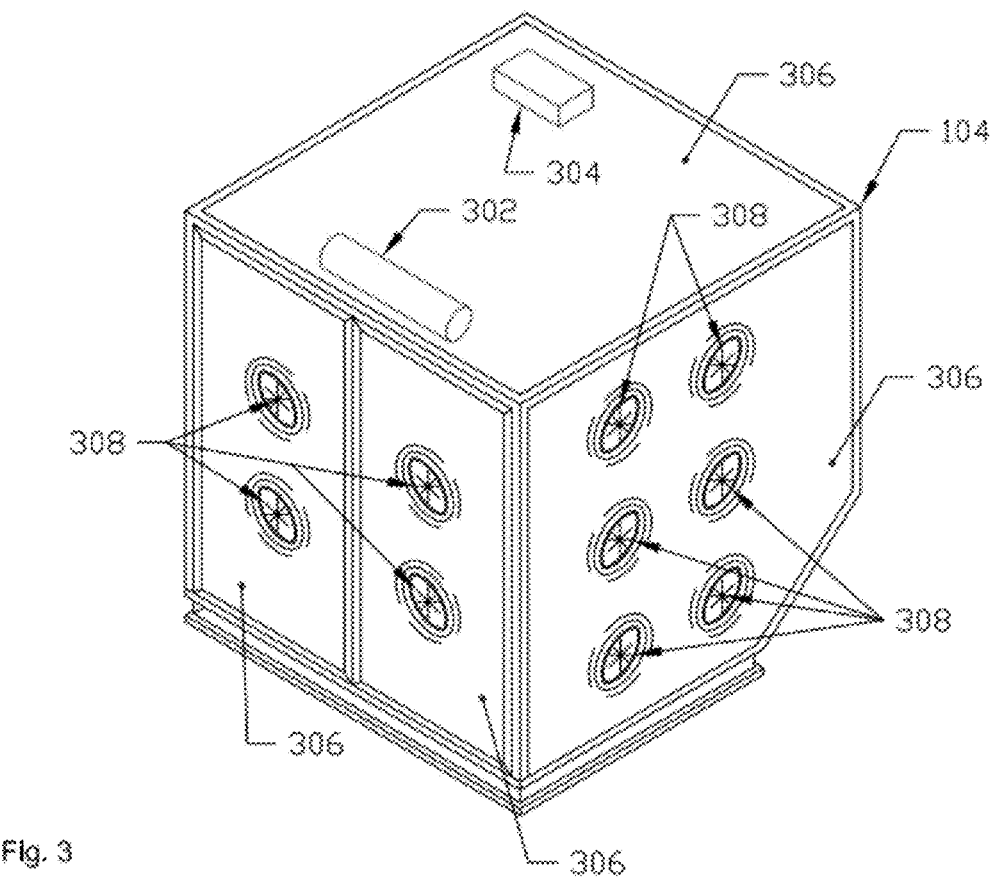
FIG. 3 is a schematic representation of a hardened cargo container according to an exemplary embodiment of the invention.

FIG. 3 is a schematic representation of a hardened cargo container 104 according to an exemplary embodiment of the invention. The cargo container 104 may include an integrated fire suppression system 302 and a GPS tracking module 304. The new design concept incorporates new materials and features that do not exist in the industry today. The outline is as follows:

Materials of Construction

Composite panels 306, similar to or the same as the composite panels 102 of FIG. 1, may be manufactured from high impact/tensile strength fiber reinforced plastic sheeting. The composite panels may include a Kevlar/ballistic core. These panels may include a ballistic Pro-Tec™ inter-ply material to enhance the resistance to penetration/expulsion of projectiles created by the explosion.

A pallet may be manufactured from aluminum or fiber reinforced plastic perimeter extrusions which may be mechanically attached to ballistic flooring material.

All material may be flame penetration resistant and meet the requirements of FAR 25 heat release requirements.

Cargo Container Design Concept

The cargo containers 104 may be manufactured with replaceable panels 306, which may be attached to extruded edge rails 502. The corners may be injection molded high-impact/tensile strength fiber reinforced thermal plastic. The attachment design may incorporate flush mounted, male/female matching threaded Clik™ self-locking fasteners 504 so that they may not protrude from the basic container surfaces. This may prevent tearing and snagging during loading and handling operation. The fasteners may be non-metallic.

The panels may be molded into curved shapes which may minimize square corners and reduce stress concentration areas. The square corners are not as efficient as rounded corners for load distribution during high stress applications caused by an explosive event. All of the panels may be pre-designed and manufactured using numerically controlled machinery, therefore interchangeability is assured for spare replacement parts.

Key Discriminating Design Features

The primary discriminating design characteristic of the cargo container according to an exemplary embodiment is founded on the basic gas law and physics. The principle of PVT may be applied to the cargo container design. If the volume (V) remains constant and the temperature (T) increases, then the pressure (P) increases. Under normal explosive conditions, a restraining structure does not posses sufficient tensile strength to contain the rapidly increasing pressure which is due to the ignition of the explosive materials wherein high heat is generated during the explosive event. The pressure needs to find a path of least resistance and therefore, ruptures the structure in order to balance the pressure to the surrounding atmosphere. All pressure vessels are designed with this concept in mind. The space shuttle Orbital Maneuvering System (OMS) uses monopropellants, which expand at a tremendous rate relative to the atmosphere and must be relieved through a pressure regulator system. This is a proven pressure relief concept.

All High-pressure pneumatic and hydraulic systems have safety devices incorporated into their construction to relieve unplanned pressure increases which are created by a system failure in the control design. Typically, these pressure systems use an inexpensive static device that operates during the over pressure event. These devices are known as relief valves or relief devices.

In an exemplary embodiment, a relief device 308 may be included as a single part manufactured out of non-metallic materials. This means that the relief device may achieve the highest, most predictable reliability possible.

Exemplary embodiments may incorporate a series of relief devices 308 which may be installed in the outer panels of the cargo containers 104. The relief devices 308 may be disc shaped. The intent of these relief devices 308 is two-fold. One is to relieve the increased pressure, which is created because of the ignition of the explosive materials. This can be accomplished by the placement of the relief device 308 in the perimeter walls of the cargo container. The second is that the relief devices 308 may create a directed charge venting concept when installed in "strategic" locations around the cargo container 104 to direct the pressure venting into the largest adjacent volume of free space in surrounding cargo hold areas. This concept allows for determination of the optimal direction for the gas/pressure displacement to minimize any negative affect on the primary aircraft structure.

The relief valves 308 may be made of non-metallic materials and may be protected in their installed positions and may be easily replaceable in case of damage during handling and loading of the containers.

Fire Suppression

Since the phenomena of explosives are to increase the temperature of the environment, thereby requiring a relief path of the increased pressure, the function of a fire suppressant is also two-fold.

First of course, fire suppression systems are designed to extinguish any potential fire inside the container due to the increased heat generated by the explosion. The second benefit is related to the first phenomena. If the fire/heat is suppressed quickly, then the temperature will also be reduced rapidly, therefore minimizing the resultant pressure build-up.

Exemplary embodiments may incorporate an integrated fire suppression system 302, such as a self-contained fire extinguishing gas system (Halon or equivalent) within each container. Such systems are highly reliable and proven for cargo and class "C" fire containment compartments in commercial aircraft today. A heat sensitive material contained within the release device may activate the fire suppression system and therefore the release of the extinguishing gas.

Tracking

One of the difficult issues with cargo containers is that they get lost or misplaced. This issue is identical to ocean freighter containers when they are unloaded and stored at a port of destination.

Exemplary embodiments may include a GPS tracking module 304, such as a "hardened" GPS device within the structure of the cargo container 104. This device may allow the container to be tracked and located anywhere in the world. This device is may be beneficial when tracking a potential terrorist target.

Exemplary embodiments may incorporate embedded bar coding that may be read with hand-held downloadable data trackers. This technique is common with moveable inventory systems currently utilized in the aircraft industry today.

Figure 5:
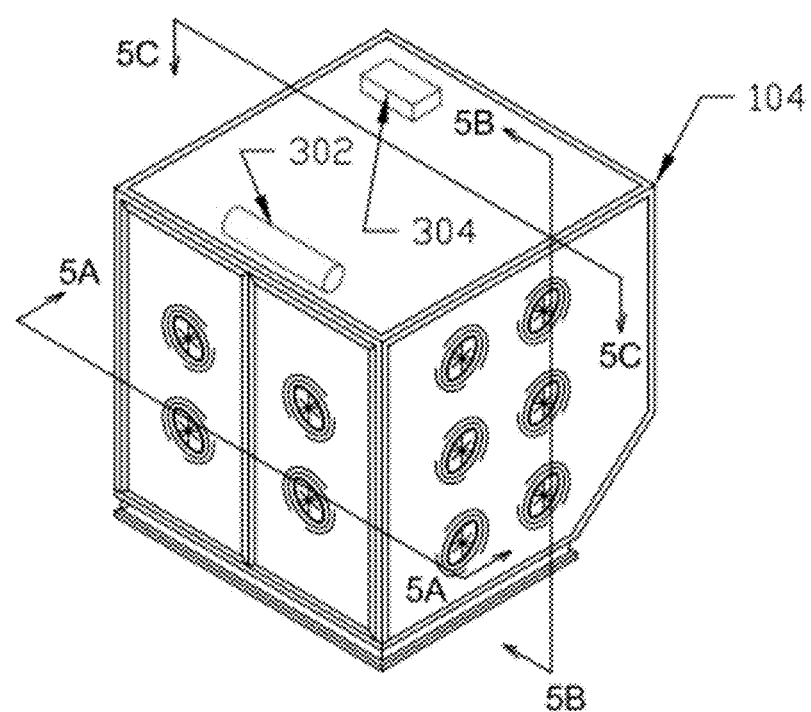
FIGS. 5-8B are schematic representations of cargo containers according to exemplary embodiments of the present invention.
Figure 5A:
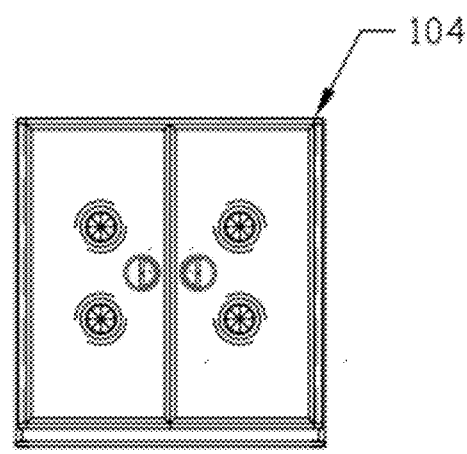
Figure 5B:
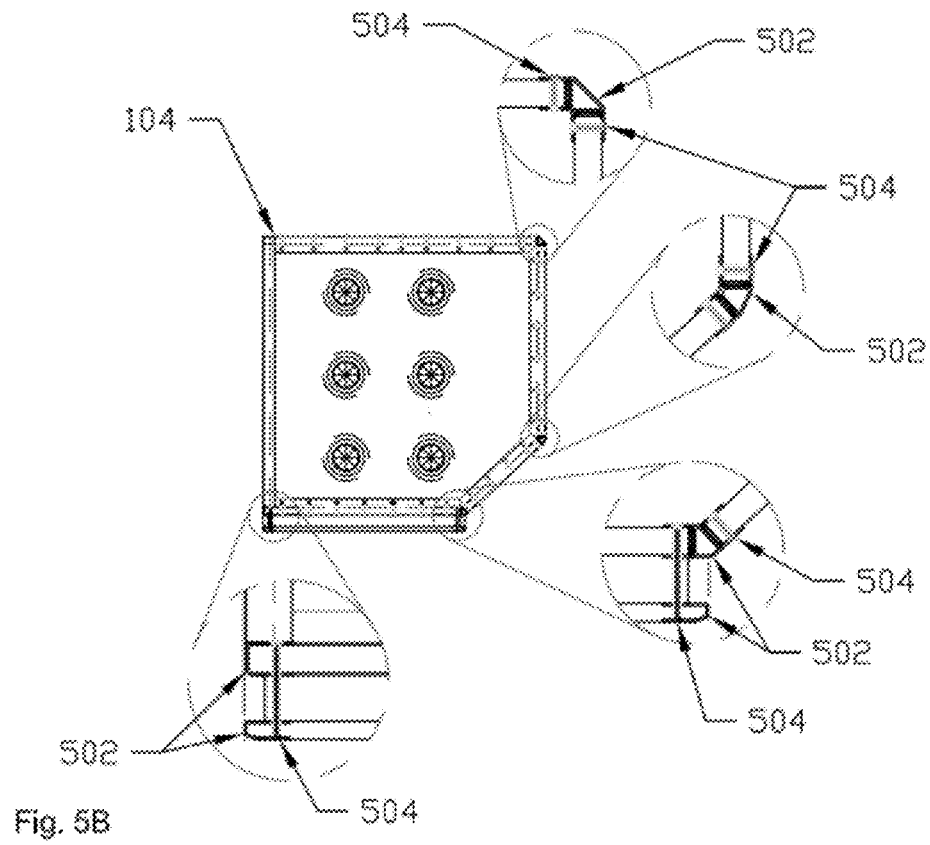
Figure 5C:
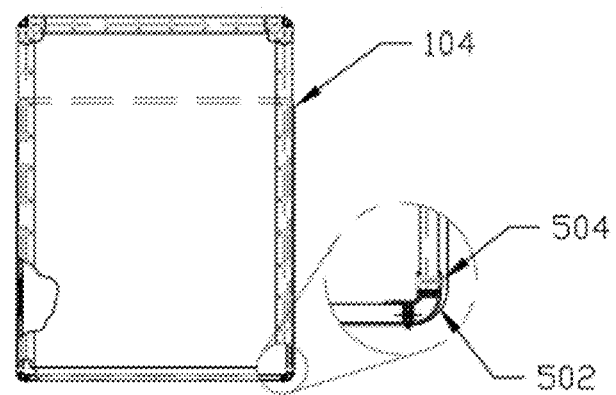
Figure 6:
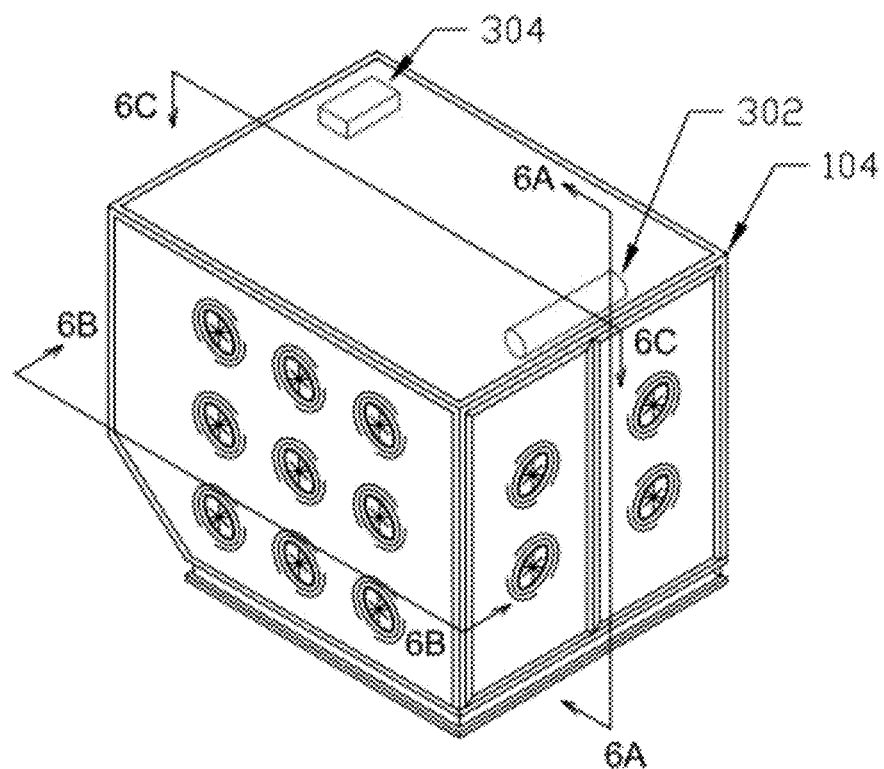
Figure 6A:
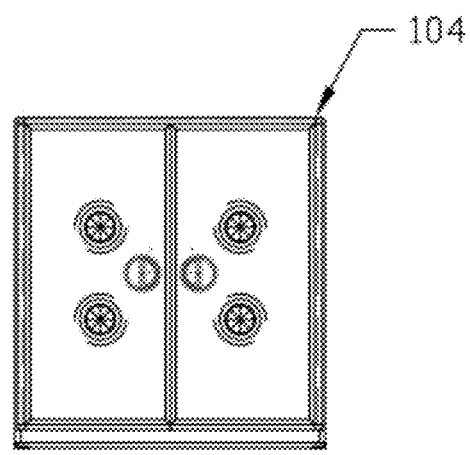
Figure 6B:
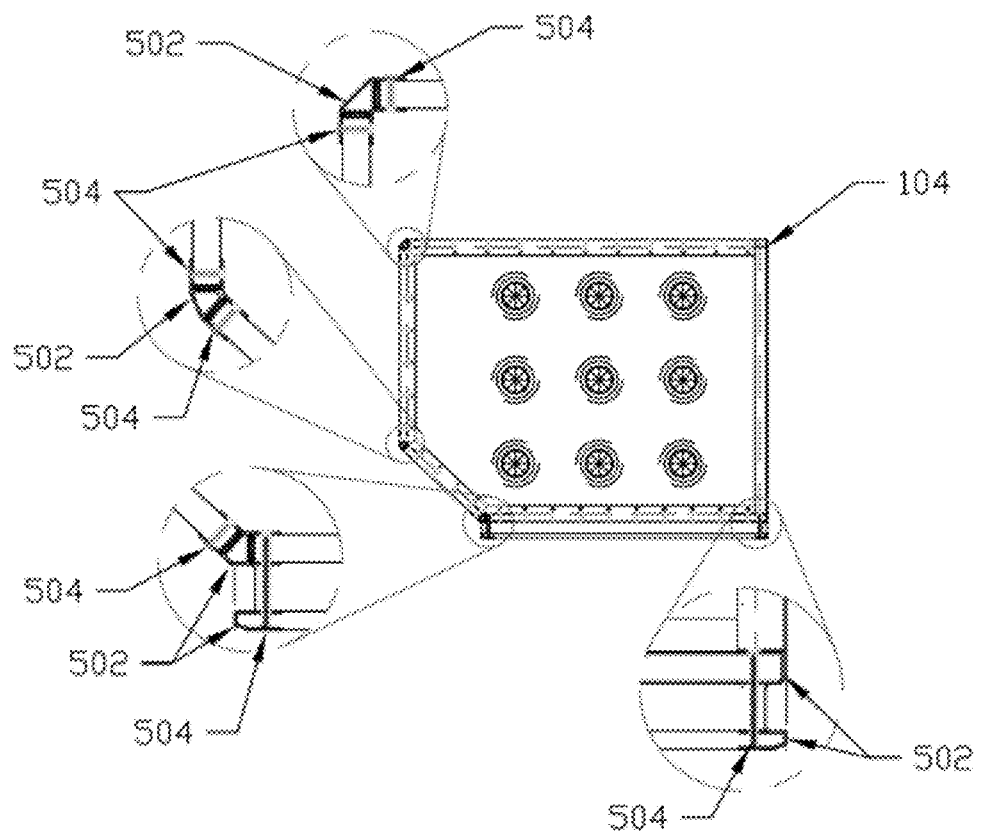
Figure 6C:
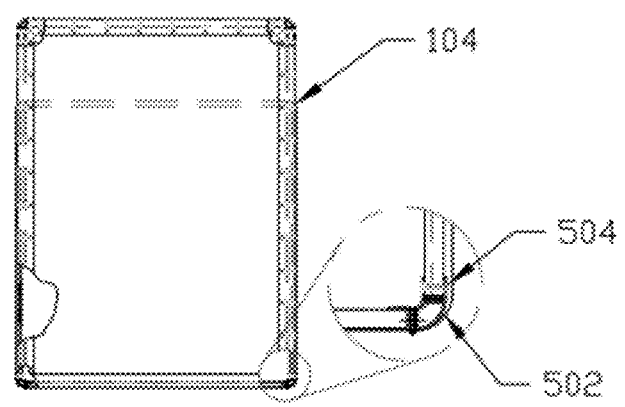
Figure 7:
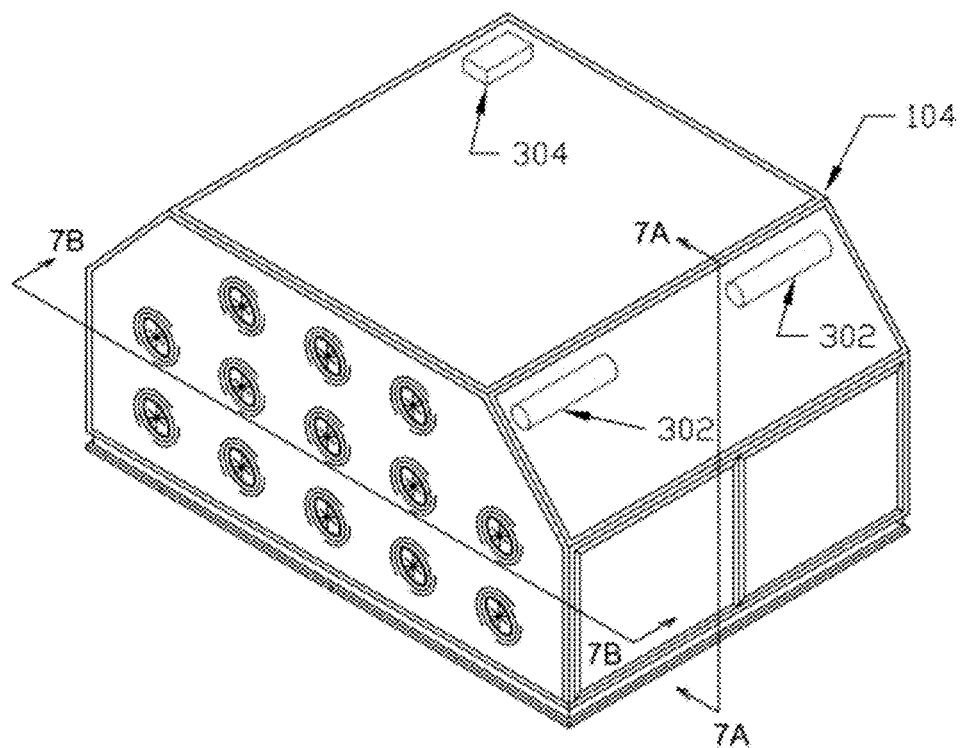
Figure 7A:
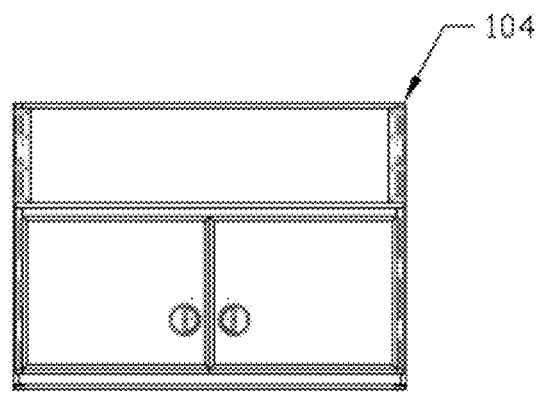
Figure 7B:
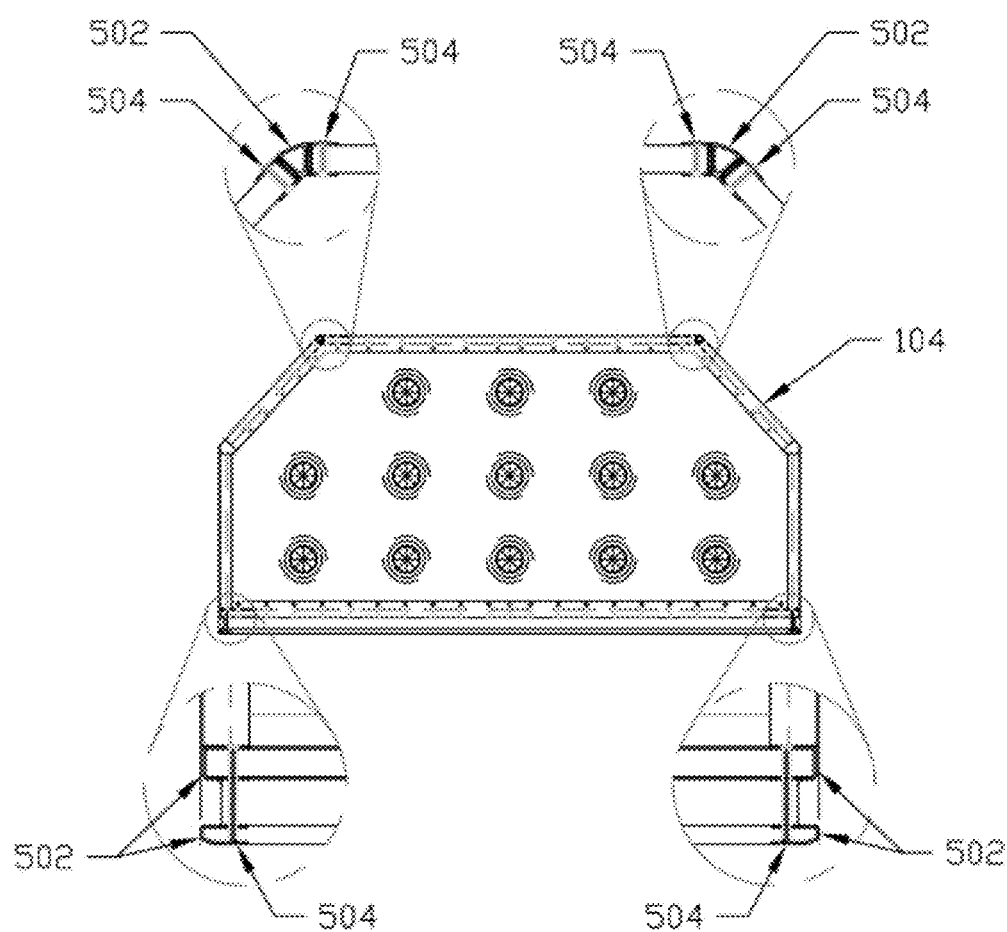
Figure 8:
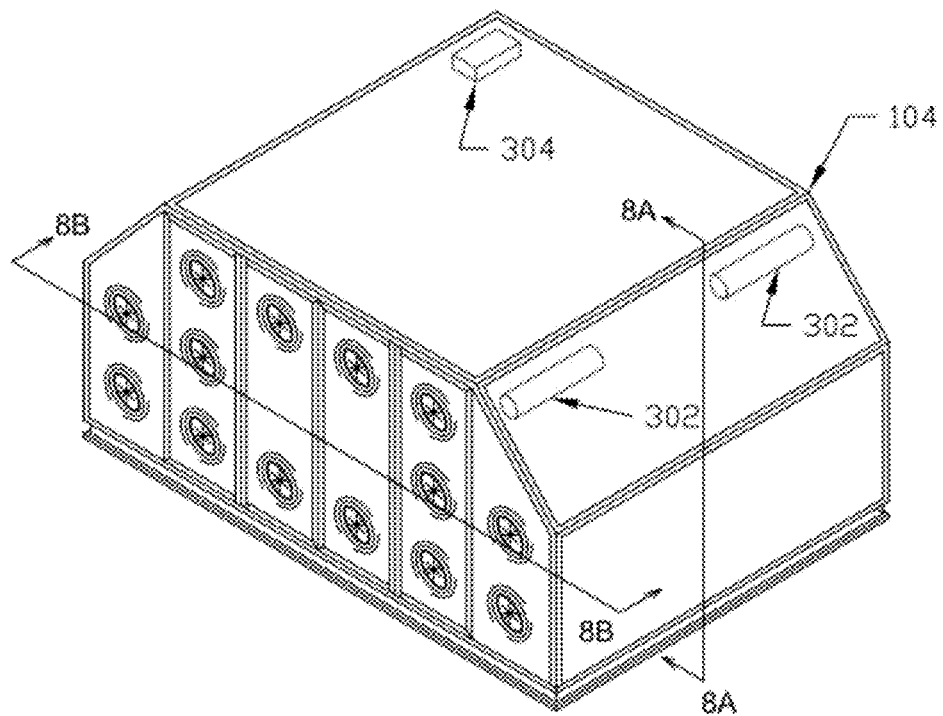
Figure 8A:
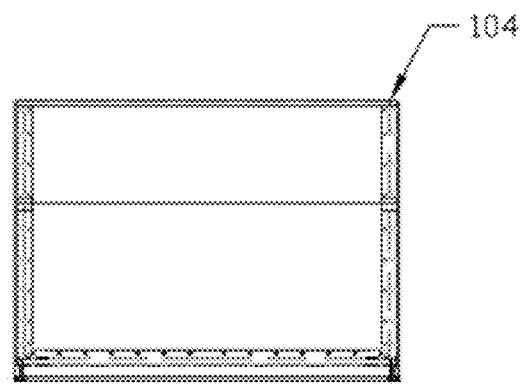
Figure 8B:
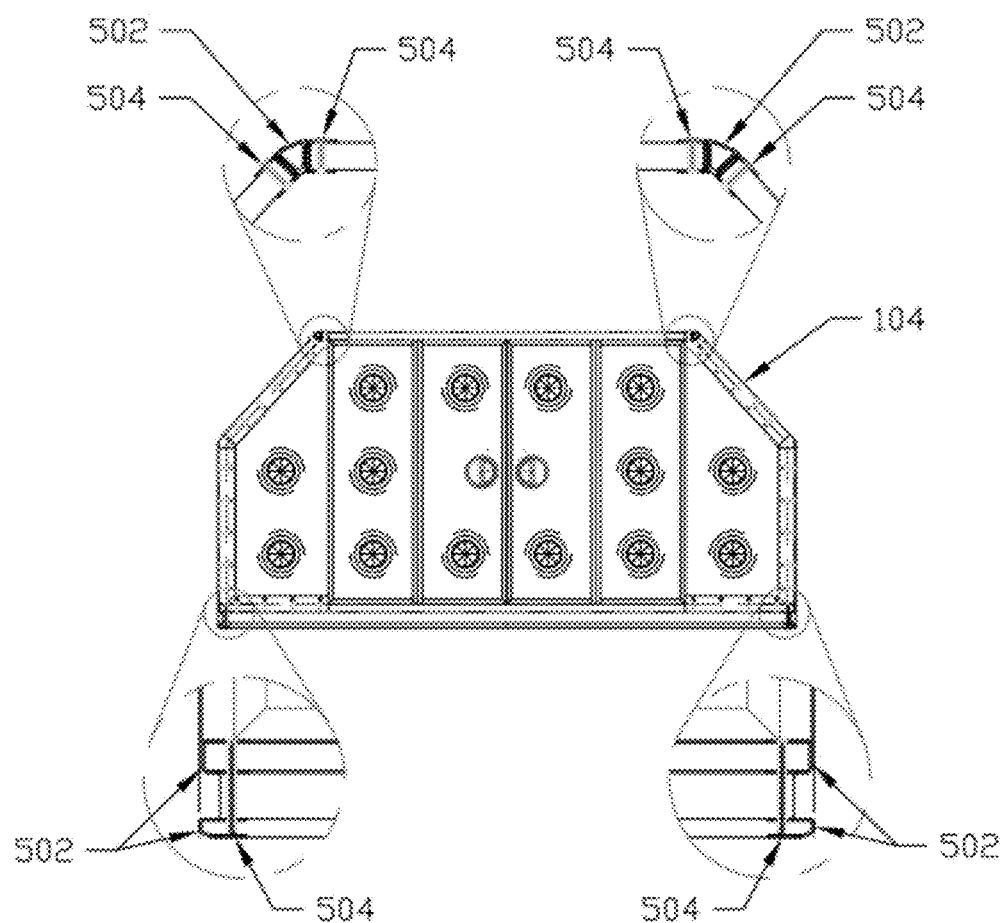

FIGS. 5-5C are schematic representations of an TATA ULD LD2 ballistic and explosive resistant cargo container 104 according to an exemplary embodiment. FIGS. 6-6C are schematic representations of an IATA ULD LD3 ballistic and explosive resistant cargo container 104 according to an exemplary embodiment. FIGS. 7-7B and 8-B are schematic representations of an IATA LD7 ballistic and explosive resistant cargo container 104 according to exemplary embodiments. Each of these figures indicates an exemplary installation and quantity of relief devices.

Interior Linings

In order to comply with the FAA proposed ruling to protect the primary and secondary flight control systems, it is necessary to harden the aircraft interior. The only known method other than that of the exemplary embodiments of the present invention would be to individually protect the control system routings (electrical: fly-by-wire, or hydraulic), with ballistic conduit or complete relocation of the systems. The relocation of the systems would provide some assurance that either the primary or secondary systems would survive an explosive event. However, this task of protecting the imbedded systems would require the aircraft be grounded for an extended period of time and the expense would be significant.

Conventional Designs

Conventional aircraft interior linings are manufactured using formed fiberglass "skins" bonded to honeycomb core. This process provides a lightweight and relatively stiff product which is used for:

Sidewalls
Stowage Bin/Doors
Ceiling Panels
Floor Boards
Cockpit Bulkheads

These are the areas of the interior which would require hardening.

According to the new design discussed below, composite panels 102 according to exemplary embodiments of the present invention may be used for the following types of interior parts and assemblies:

Interior Sidewalls
Interior Dado Panels
Cove Light Panels
Overhead Stowage Bin Structures
Overhead Stowage Bin Doors
Ceiling Panels
Cabin Lighting Panels
Cargo Compartment Floor Boards
Cargo Compartment Bulkheads
Floor Boards
Cargo Compartment Liner Panels
Aircraft Door Liners
Aircraft Door Surrounds
Evacuation Slide Covers
Cockpit Bulkheads
Aircraft Cabin Monuments
Galleys
Closets
Bulkheads
Dividers
Video Control Cabinetry
Lavatories
Aft Cabin Bulkheads
9G or Aft Pressure Bulkheads Any other cabin or cargo item which would require hardening due to its location within the aircraft Interior New Design for Interior Systems Existing linings within an aircraft may be replaced with new linings manufactured from a similar group of materials, but in a different laminate construction, such as that of the cargo containers 104. A structural laminate of fiber reinforced plastics may be created with an explosive and ballistic resistant Pro-Tec™ core to create replacement sidewall panels, ceiling panels, floor boards, stowage bin doors, cockpit bulkheads, etc., as listed above.

These panels 102 may act as a "liner" for the passenger compartment which may provide a ballistic shield which may protect the aircraft control systems from damage due to ballistic projectiles that have been created by an explosive event within the aircraft. The criteria for the ballistic projectiles are defined within the FAA proposed rule extract. In addition to lining the passenger compartment with these ballistic and flammability resistant panels, the same or similar product (in a different form) can be used for the same purpose for cargo compartment liners on aircraft that do not accommodate cargo containers. These materials are proven to meet the ballistic resistance requirements currently defined by the FAA.

Figure 4:
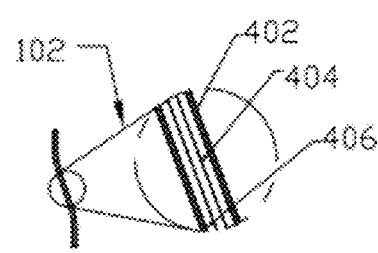
FIG. 4 is a schematic representation of the construction of a ballistic and flammability resistant sidewall composite panel according to an exemplary embodiment of the present invention.

FIG. 4 is a schematic representation of the construction of a ballistic and flammability compliant sidewall composite panel 102. The composite panel 102 may include a first Fiber-Reinforced Plastic (FRP) layer 402, a ballistic resistant laminate core layer 404 such as a Pro-Tec™ ballistic resistant laminate core layer 404, and a second FRP layer 406. The ballistic resistant laminate core layer may be formed between the first and second FRP layers 402, 406. The panel 102 may be ballistic and flammability compliant The composite panel 102 may be formed using crush core technology.

Additional protection may be provided by creating complete explosion proof stowage bins using a cargo container design concept.

Reinforced cockpit bulkheads may be produced using the same design and materials of construction as the cargo container. The relief devices can accommodate explosive decompression as well as explosive and ballistic events as defined by the FAA proposed rules.

Figure 9A:
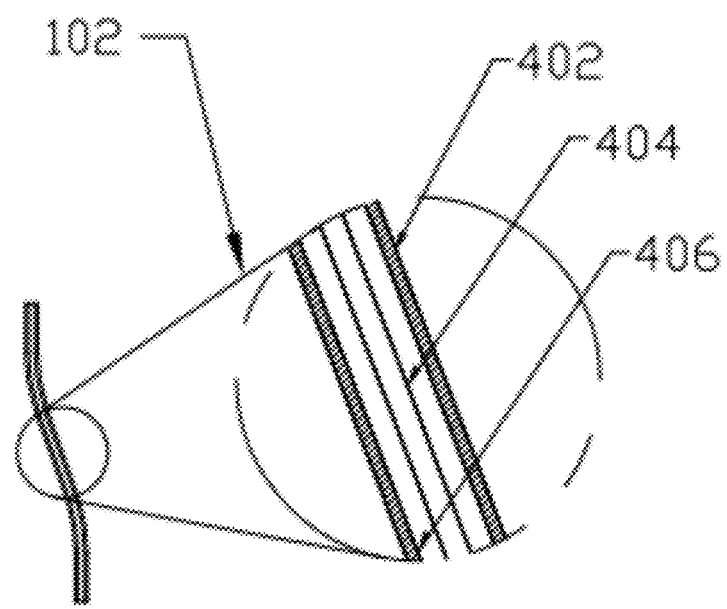
FIGS. 9A-9F are schematic representations of the construction of composite panels according to exemplary embodiments of the present invention.

FIG. 9A is a schematic representation of the construction of a sidewall composite panel 102 similar to or the same as that shown in FIG. 4. The sidewall composite panel 102 may be 0.18 to 0.25 inches thick.

Figure 9B:
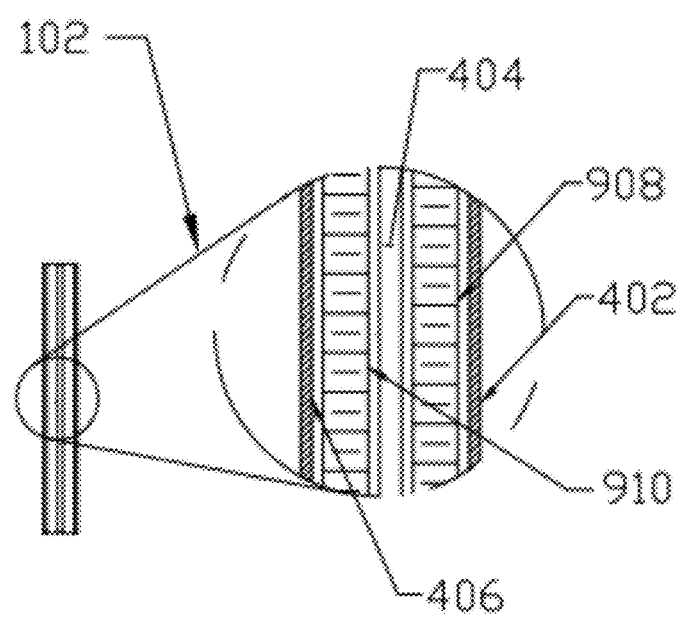

FIG. 9B is a schematic representation of the construction of a cockpit bulkhead composite panel 102 according to an exemplary embodiment of the present invention. The cockpit bulkhead composite panel 102 may include a first FRP layer 402, a ballistic resistant laminate core layer 404, and second FRP layer 406. The cockpit bulkhead composite panel 102 may additionally include first and second honeycomb/Nomex™/Kevlar™ layers 908, 910. The cockpit bulkhead composite panel 102 may be 0.75-1.25 inches thick.

Figure 9C:
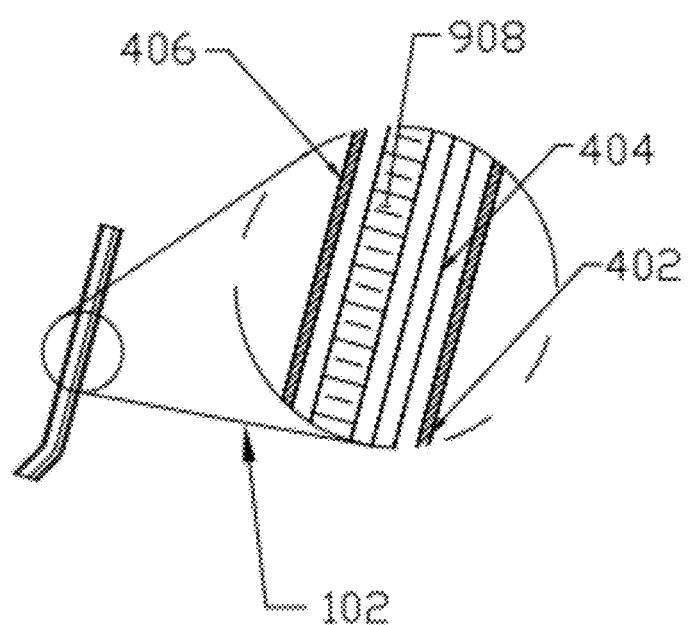

FIG. 9C is a schematic representation of the construction of a bin door composite panel 102 according to an exemplary embodiment of the present invention. The bin door composite panel 102 may include a first FRP layer 402, a ballistic resist laminate core layer 404, and a second FRP layer 406. The bin door composite panel 102 may further include a honeycomb/Nomex™/Kevlar™ layer 908. The bin door composite panel 102 may be 0.40-0.50 inches thick.

Figure 9D:
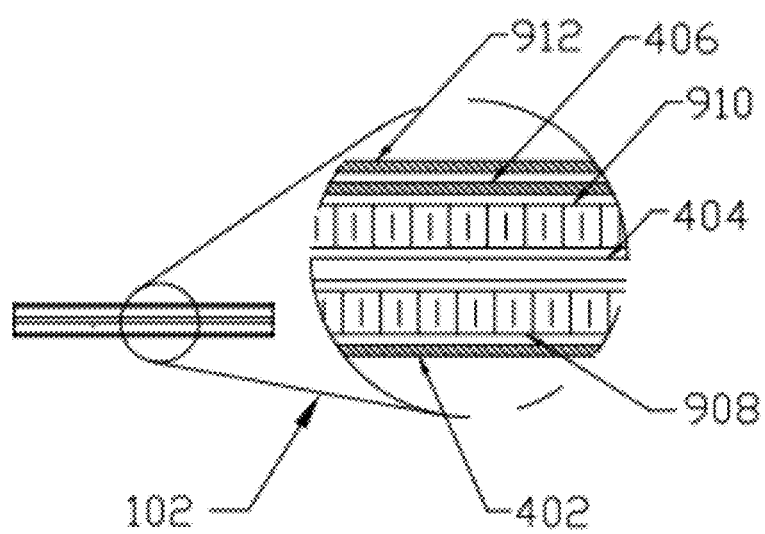

FIG. 9D is a schematic representation of the construction of a floorboard composite panel 102 according to an exemplary embodiment of the present invention. The floorboard composite panel 102 may include a first FRP layer 402, a ballistic resistant laminate core layer 404, and second FRP layer 406. The floorboard composite panel 102 may include first and second honeycomb/Nomex™/Kevlar™ layers 908, 910. The floorboard composite panel 102 may further include a third FRP layer 912. The floorboard composite panel 102 may be 0.375-0.500 inches thick.

Figure 9E:
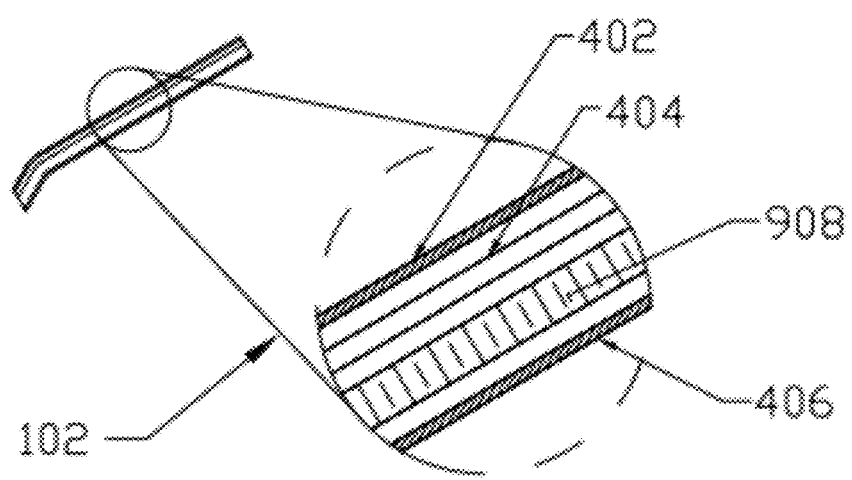

FIG. 9E is a schematic representation of the construction of a ceiling composite panel 102 according to an exemplary embodiment of the present invention. The ceiling composite panel 102 may include a first FRP layer 402, a ballistic resist laminate core layer 404, and a second FRP layer 406. The ceiling composite panel 102 may further include a honeycomb/Nomex™/Kevlar™ layer 908. The ceiling composite panel 102 may be 0.40-0.50 inches thick.

Figure 9F:
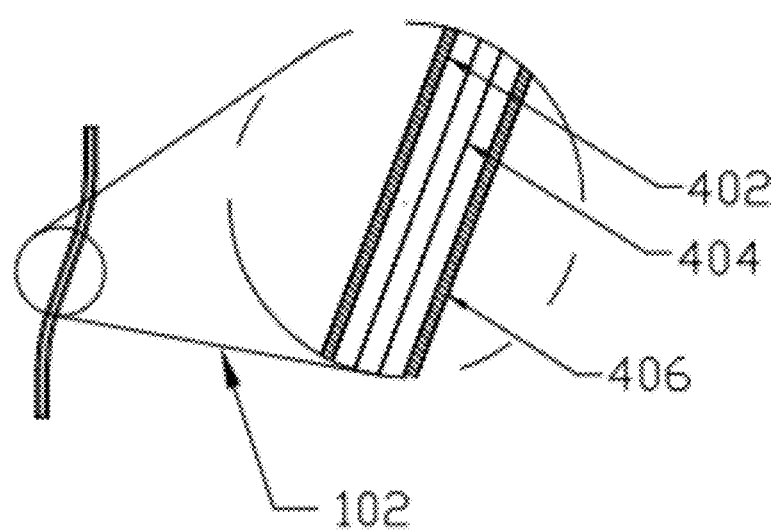

FIG. 9F is a schematic representation of the construction of a cargo lining composite panel 102 similar to or the same as that shown in FIG. 4. The cargo lining composite panel 102 may be 0.125 inches thick.

Manufacturing Processes

The quantities of parts and assemblies to support the transport aircraft industry are significant. The expected demand may surpass the existing capacity in the entire aircraft structures industry. New aircraft variants are entering into production, B-787, A-380 and A-350, in addition to rate of production increases with the existing fleet of commercial aircraft.

Therefore, the most efficient methods to use in the manufacturing of parts and assemblies of exemplary embodiments include a highly tooled process which incorporates a large scale robotic assembly operation.

The products discussed herein may be manufactured with class "A" hard tooling with CNC machining of parts and robotic assembly.

Existing manufacturing methods may include the following processes which are available within the aircraft industry today.

Injection Molding
CNC Milling and Lathe
Plastic Extrusions
Flat Panel Press
Matched Metal Molding for Composites
Crush Core Technique
Vacuum Bag Lay-up
Heat Forming of Fiber Reinforced Plastics
Bonding and Assembly of Composite Parts
Honeycomb Core Manufacturing
Robotic Assembly and Materials Logistics Systems
Automated Inventory Control System
Market Analysis The regulatory requirements may affect all transport aircraft in the world. Estimated quantities and types of aircraft are included in the following chart.

It is believed that replacement of 600,000 existing cargo containers and pallets and the addition of all new container deliveries for newly manufactured aircraft is a realistic estimate.

| Manufacturer | Aircraft | Existing Fleet | On Order | On Option | Total |
|---|---|---|---|---|---|
| Boeing | 737 | 4,987 | 1,093 | 795 | 6,875 |
| | 747 (-200 & above) | 1,081 | 35 | 6 | 1,122 |
| | 757 | 1,050 | 0 | 0 | 1,050 |
| | 767 | 941 | 14 | 34 | 989 |
| | 777 | 552 | 264 | 71 | 887 |
| | 787 | 0 | 342 | 111 | 453 |
| | Total | 8,611 | 1,748 | 1,017 | 11,376 |
| McDonnel/Douglas | MD-80/MD-90 | 1,035 | 0 | 0 | 1,035 |
| | MD-11 | 60 | 0 | 0 | 60 |
| | Total | 1,095 | 0 | 0 | 1,095 |
| Airbus | A-300 | 481 | 12 | 0 | 493 |
| | A-310 | 231 | | 0 | 231 |
| | A-320 | 2,711 | 1,445 | 1,036 | 5,192 |
| | A-330/A-340 | 722 | 232 | 85 | 1,039 |
| | A-350 | 0 | 100 | 24 | 124 |
| | A-380 | 0 | 133 | 48 | 181 |
| | Total | 4,145 | 1,922 | 1,193 | 7,260 |
| Bombardier | CRJ-700 | 216 | 48 | 76 | 340 |
| | CRJ-900 | 41 | 22 | 12 | 75 |
| | Total | 257 | 70 | 88 | 415 |
| Embraer | ERJ-170 | 130 | 53 | 213 | 396 |
| | ERJ-190 | 39 | 277 | 221 | 537 |
| | Total | 169 | 330 | 434 | 933 |
| Total Addressable Market | | 14,277 | 4,070 | 2,732 | 21,079 |

Ballistic and Explosion Resistant Target Market (over 50 Pax) Apr. 1, 2006

Although embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A cargo container of a ballistic resistant and explosive protective system for an aircraft, the cargo container comprising:
   a plurality of modular composite panels, each composite panel comprising:
      a first layer and second layer formed of a fiber-reinforced plastic material, and
      a ballistic resistant laminate core layer formed between the first layer and the second layer, wherein the composite panels are integrally combined and installed at an interior of the aircraft;

the cargo container further comprising at least one relief device formed at an outer surface of at least one composite panel of the plurality of composite panels to relieve and direct increased pressure created due to an ignition of explosive materials into the largest volume of free space adjacent the cargo container, wherein the at least one relief device is a valve or a disk.

2. The cargo container of claim 1, wherein each composite panel further comprises:

a honeycomb layer formed between at least one of the ballistic resistant laminate core layer and the first layer, and the ballistic resistant laminate core layer and the second layer.

3. The cargo container of claim 2, wherein each composite panel further comprises:

a third layer formed of the fiber-reinforced plastic material and adjacent to the first layer or the second layer.

4. The cargo container of claim 1, wherein the at least one relief device is formed of a non-metallic material.

5. The cargo container of claim 1, wherein the interior of the aircraft comprises at least one of interior sidewalls, ceiling panels, floor boards, doors, bulkheads, and cargo compartment lining.

6. The cargo container of claim 1, wherein the composite panels are formed of flame penetration resistant material.

7. The cargo container of claim 1, wherein each composite panel is replaceable.

8. A cargo container of a ballistic resistant and explosive protective system for an aircraft, the cargo container comprising:

a pallet portion comprising a plurality of rails extruded from perimeter edges thereof;

a plurality of modular composite panels, each composite panel comprising:

a first layer and second layer formed of a fiber-reinforced plastic material, and a ballistic resistant laminate core layer formed between the first layer and the second layer, the composite panels being attached to the pallet portion via the plurality of rails; and a plurality of locking devices for interlocking the composite panels to each other;

the cargo container further comprising at least one relief device formed at an outer surface of at least one composite panel of the plurality of composite panels to relieve and direct increased pressure created due to an ignition of explosive materials into the largest volume of free space adjacent the cargo container, wherein the at least one relief device is a valve or a disk.

9. The cargo container of claim 8, wherein the plurality of locking devices are self-locking.

10. The cargo container of claim 8, wherein the at least one relief device and the locking devices are formed of a non-metallic material.

11. The cargo container of claim 8, wherein the pallet portion is formed of aluminum or a ballistic flooring material wherein the rails are mechanically attached thereto.

12. The cargo container of claim 8, wherein the composite panels, pallet portion, and rails are formed of flame penetration resistant material.

13. The cargo container of claim 8, wherein each composite panel is replaceable.

14. The cargo container of claim 8, further comprising:

a fire extinguishing gas system comprising:

a release device including a heat-sensitive material, and an extinguishing gas material, wherein the release device is activated upon application of heat to the heat sensitive material, and the extinguishing gas is released.

15. The cargo container of claim 14, wherein the extinguishing gas is halon.

16. The cargo container of claim 8, further comprising a tracking device to track a location of the cargo container.

* * * * *